United States Patent
Okamura et al.

(10) Patent No.: US 12,145,061 B2
(45) Date of Patent: Nov. 19, 2024

(54) COMPUTER-READABLE NON-TRANSITORY STORAGE MEDIUM HAVING STORED THEREIN GAME PROGRAM, GAME PROCESSING SYSTEM, GAME PROCESSING APPARATUS, AND GAME PROCESSING METHOD

(71) Applicant: NINTENDO CO., LTD., Kyoto (JP)

(72) Inventors: Yoko Okamura, Kyoto (JP); Keijiro Inoue, Kyoto (JP); Ai Yamamoto, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 203 days.

(21) Appl. No.: 17/862,914

(22) Filed: Jul. 12, 2022

(65) Prior Publication Data

US 2023/0249069 A1 Aug. 10, 2023

(30) Foreign Application Priority Data

Feb. 4, 2022 (JP) .................. 2022-016300

(51) Int. Cl.
*A63F 13/52* (2014.01)
*A63F 13/812* (2014.01)
*G06T 15/20* (2011.01)

(52) U.S. Cl.
CPC ............ *A63F 13/52* (2014.09); *A63F 13/812* (2014.09); *G06T 15/20* (2013.01)

(58) Field of Classification Search
CPC ........ A63F 13/53; A63F 13/52; A63F 13/812; G06T 15/20
See application file for complete search history.

(56) References Cited

U.S. PATENT DOCUMENTS

| 6,151,026 A | 11/2000 | Iwade et al. |
| 6,183,363 B1 * | 2/2001 | Ishihara ................. A63F 13/44 463/31 |
| 2002/0163519 A1 | 11/2002 | Kitsutaka |

(Continued)

FOREIGN PATENT DOCUMENTS

| JP | 2000-251094 | 9/2000 |
| JP | 2002-063596 | 2/2002 |

(Continued)

OTHER PUBLICATIONS

The VideoGames Museum, "Game Boy Advance Droopy's Tennis Open © 2002 LSP—Gameplay", 2020, Youtube.com, pp. 1-9, at https://www.youtube.com/watch?v=AsETnYh6YrA (last visited Mar. 27, 2024) (Year: 2020).*

(Continued)

*Primary Examiner* — Steve Rowland
(74) *Attorney, Agent, or Firm* — Nixon & Vanderhye, PC

(57) ABSTRACT

In a virtual space, a virtual camera is set in a direction such that at least a part of a ground is included in the field of view of the virtual camera. Movement of a predetermined object located above the ground in the virtual space is controlled based on game processing. In a rendering process of generating, based on the virtual camera, a game image including the ground and the object, if the height of the object in the virtual space is greater than a predetermined height, the game image is generated such that a contour of the object is rendered.

22 Claims, 7 Drawing Sheets

(56) References Cited

U.S. PATENT DOCUMENTS

| | | | | |
|---|---|---|---|---|
| 2013/0286004 | A1* | 10/2013 | McCulloch | G06T 19/006 |
| | | | | 345/419 |
| 2014/0301601 | A1* | 10/2014 | Marty | G06T 7/80 |
| | | | | 382/103 |
| 2017/0010662 | A1* | 1/2017 | Nishizawa | G06F 3/013 |
| 2019/0329133 | A1 | 10/2019 | Okamura | |
| 2021/0304550 | A1* | 9/2021 | Kelly | G06T 7/10 |
| 2022/0343514 | A1* | 10/2022 | Jayaram | G06T 7/248 |
| 2023/0398451 | A1* | 12/2023 | Yamamoto | A63F 13/5378 |
| 2024/0094882 | A1* | 3/2024 | Brewer | G06F 3/04842 |

FOREIGN PATENT DOCUMENTS

| | | |
|---|---|---|
| JP | 2016-151865 | 8/2016 |
| JP | 2018-112924 | 7/2018 |
| JP | 2021-108813 | 8/2021 |

OTHER PUBLICATIONS

Nov. 21, 2023 Office Action issued in Japanese Patent Application No. 2022-016300, pp. 1-3 [machine translation included].

* cited by examiner

FIG.3  EXAMPLE OF THICKNESS OF CONTOUR OF BALL 50 (SIZE OF CONTOUR OBJECT 90) IN VIRTUAL SPACE

| | DISTANCE: 25.00 M (FROM VIRTUAL CAMERA) | DISTANCE: 27.00 M | DISTANCE: 29.00 M | DISTANCE: 31.00 M OR MORE |
|---|---|---|---|---|
| HEIGHT: 4.00 M OR MORE | (M) TRANSPARENCY: 0% DIAMETER: 100.00 MM THICKNESS OF CONTOUR: 15.00 MM | (N) TRANSPARENCY: 0% DIAMETER: 100.00 MM THICKNESS OF CONTOUR: 15.00 MM | (O) TRANSPARENCY: 0% DIAMETER: 100.00 MM THICKNESS OF CONTOUR: 15.00 MM | (P) TRANSPARENCY: 0% DIAMETER: 100.00 MM THICKNESS OF CONTOUR: 15.00 MM |
| HEIGHT: 3.50 M | (I) TRANSPARENCY: 50% DIAMETER: 85.00 MM THICKNESS OF CONTOUR: 7.50 MM | (J) TRANSPARENCY: 50% DIAMETER: 90.00 MM THICKNESS OF CONTOUR: 10.00 MM | (K) TRANSPARENCY: 50% DIAMETER: 95.00 MM THICKNESS OF CONTOUR: 12.50 MM | (L) TRANSPARENCY: 50% DIAMETER: 100.00 MM THICKNESS OF CONTOUR: 15.00 MM |
| HEIGHT: 3.25 M | (E) TRANSPARENCY: 75% DIAMETER: 77.50 MM THICKNESS OF CONTOUR: 3.75 MM | (F) TRANSPARENCY: 75% DIAMETER: 80.00 MM THICKNESS OF CONTOUR: 5.00 MM | (G) TRANSPARENCY: 75% DIAMETER: 90.00 MM THICKNESS OF CONTOUR: 10.00 MM | (H) TRANSPARENCY: 75% DIAMETER: 100.00 MM THICKNESS OF CONTOUR: 15.00 MM |
| HEIGHT: 3.00 M OR LESS (FROM GROUND) | (A) TRANSPARENCY: 100% DIAMETER: 70.00 MM THICKNESS OF CONTOUR: 0.00 MM | (B) TRANSPARENCY: 100% DIAMETER: 70.00 MM THICKNESS OF CONTOUR: 0.00 MM | (C) TRANSPARENCY: 100% DIAMETER: 70.00 MM THICKNESS OF CONTOUR: 0.00 MM | (D) TRANSPARENCY: 100% DIAMETER: 70.00 MM THICKNESS OF CONTOUR: 0.00 MM |

BALL DIAMETER: 70.00 MM

FIG.8
| | DISTANCE: 25.00 M OR MORE |
|---|---|
| HEIGHT: 4.00 M OR MORE | (D) 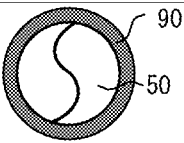<br>TRANSPARENCY: 0%<br>DIAMETER: 100.00 MM<br>THICKNESS OF CONTOUR: 15.00 MM |
| HEIGHT: 3.50 M | (C) 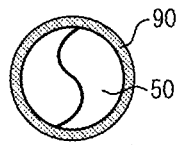<br>TRANSPARENCY: 0%<br>DIAMETER: 90.00 MM<br>THICKNESS OF CONTOUR: 10.00 MM |
| HEIGHT: 3.25 M | (B) 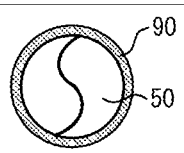<br>TRANSPARENCY: 0%<br>DIAMETER: 80.00 MM<br>THICKNESS OF CONTOUR: 5.00 MM |
| HEIGHT: 3.00 M OR LESS (FROM GROUND) | (A) 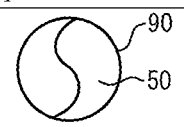<br>TRANSPARENCY: 0%<br>DIAMETER: 70.00 MM<br>THICKNESS OF CONTOUR: 0.00 MM |
BALL DIAMETER: 70.00 MM

COMPUTER-READABLE NON-TRANSITORY STORAGE MEDIUM HAVING STORED THEREIN GAME PROGRAM, GAME PROCESSING SYSTEM, GAME PROCESSING APPARATUS, AND GAME PROCESSING METHOD

CROSS REFERENCE TO RELATED APPLICATION

This application claims priority to Japanese Patent Application No. 2022-16300 filed on Feb. 4, 2022, the entire contents of which are incorporated herein by reference.

FIELD

The exemplary embodiments relate to game processing of a competitive sport game or the like.

BACKGROUND AND SUMMARY

Conventionally, there has been known a technique of rendering a contour of an object during a process of rendering a virtual space in which the object is disposed.

In the above technique, the contour of the object is always rendered. However, there are cases where the contour of the object is to be rendered and cases where the contour of the object is not to be rendered. Therefore, it is desirable that whether or not to render the contour of the object can be determined through a simple process.

Therefore, an object of an embodiment of the present disclosure is to provide a game program, a game system, a game apparatus, and a game processing method capable of determining whether or not to render a contour of an object through a simple process, and rendering the contour on the basis of the determination result.

Configuration examples for achieving the above objects are described below.

A configuration example 1 relates to a non-transitory computer-readable storage medium having stored therein instructions that, when executed by a processor of an information processing apparatus, cause the information processing apparatus to: set, in a virtual space, a virtual camera in a direction such that at least a part of a ground arranged in the virtual space is within a field of view of the virtual camera; control, based on game processing, movement of a predetermined object located above the ground in the virtual space; and perform, based on the virtual camera, a rendering process of generating a game image that includes the ground and the object, and when a height of the object in the virtual space is higher than a predetermined height, generate the game image through a rendering process of rendering a contour of at least the object.

In the above configuration example, in a situation where the contour of the object is desired to be rendered when the object in the air overlaps the distant ground or the background, determination as to whether or not to render the contour can be performed through a simple process.

According to a configuration example 2, in the configuration example 1, in the rendering process, the instructions may cause the information processing apparatus to render the contour with opacity according to the height of the object.

In the above configuration example, the contour of the object can be emphasized according to the height of the object.

According to a configuration example 3, in the configuration example 1, in the rendering process, the instructions may cause the information processing apparatus to generate the game image through a rendering process of rendering the contour by rendering a contour object larger than the object.

In the above configuration example, the contour can be rendered by rendering the contour object in the same way as the object.

According to a configuration example 4, in the configuration example 1, in the rendering process, the instructions may further cause the information processing apparatus to generate the game image through a rendering process in which the contour is thickly rendered with respect to a size of the rendered object, according to a depth of the object with respect to the virtual camera.

In the above configuration example, even when the object is located to the back and the size of the object is reduced, the contour of the object does not become hard to be seen, whereby visibility of the object can be ensured.

According to a configuration example 5, in the configuration example 1, in the rendering process, the instructions may further cause the information processing apparatus to generate the game image through a rendering process in which the contour is rendered to be thick with respect to a size of the rendered object, according to the height of the object.

In the above configuration example, even when the object is located high and overlaps the background or the like, the contour of the object does not become hard to be seen, whereby visibility of the object can be ensured.

According to a configuration example 6, in the configuration example 3, in the rendering process, the instructions may further cause the information processing apparatus to generate the game image through the rendering process such that a size of the contour object is increased according to a depth of the object with respect to the virtual camera.

In the above configuration example, visibility of the object can be ensured.

According to a configuration example 7, in the configuration example 1, the instructions may cause the information processing apparatus to perform, as the game processing, a process of causing a player character in the virtual space to hit back the object, based on an operation input.

In the above configuration example, in the game where the player character is caused to hit back the object, the contour of the object is rendered to prevent the object to be hit back from being hard to be seen.

According to a configuration example 8, in the configuration example 7, the object may be a ball object. The at least part of the ground may be a court where the player character and an opponent character that is an opponent of the player character are arranged. The instructions may cause the information processing apparatus to set the virtual camera, at a position behind and above the player character, in a direction such that the court is within the field of view of the virtual camera, and perform, as the game processing, sport game processing in which the player character is caused to return the ball object hit by the opponent character, based on an operation input.

In the above configuration example, in a situation where the contour of the ball is desired to be rendered when the ball overlaps the background or the like outside the court, determination as to whether there is almost no problem (whether or not to render the contour) can be performed through a simple process.

According to a configuration example 9, in the configuration example 8, the instructions may further cause the information processing apparatus to control movement of the player character on the court, based on an operation input, and shift the position of the virtual camera in accordance with movement of the player character.

According to a configuration example 10, in the configuration example 8, the court may be a tennis court, and the sport game processing may be tennis game processing.

In the above configuration example, visibility of the object can be ensured in the tennis game.

According to the exemplary embodiment, whether or not to render a contour of an object can be determined through a simple process, and rendering of the contour can be performed on the basis of the determination result.

These and other objects, features, aspects and advantages of the present invention will become more apparent from the following detailed description of non-limiting example embodiments when taken in conjunction with the accompanying drawings.

BRIEF DESCRIPTION OF THE DRAWINGS

FIG. 3 is a diagram illustrating the thickness of a contour of a ball (the size of a contour object) in a virtual space;

FIG. 8 illustrates a modification of the thickness of the contour of the ball (the size of the contour object) in the virtual space.

DETAILED DESCRIPTION OF NON-LIMITING EXAMPLE EMBODIMENTS

Hereinafter, one exemplary embodiment will be described.

[Hardware Configuration of Information Processing Apparatus]

First, an information processing apparatus for executing information processing according to the exemplary embodiment will be described. The information processing apparatus is, for example, a smartphone, a stationary or handheld game apparatus, a tablet terminal, a mobile phone, a personal computer, a wearable terminal, or the like. The information processing according to the exemplary embodiment can also be applied to a game system including a game apparatus, etc., as described above, and a predetermined server. In the exemplary embodiment, a stationary game apparatus (hereinafter, referred to simply as "game apparatus") is described as an example of the information processing apparatus.

Figure 1:
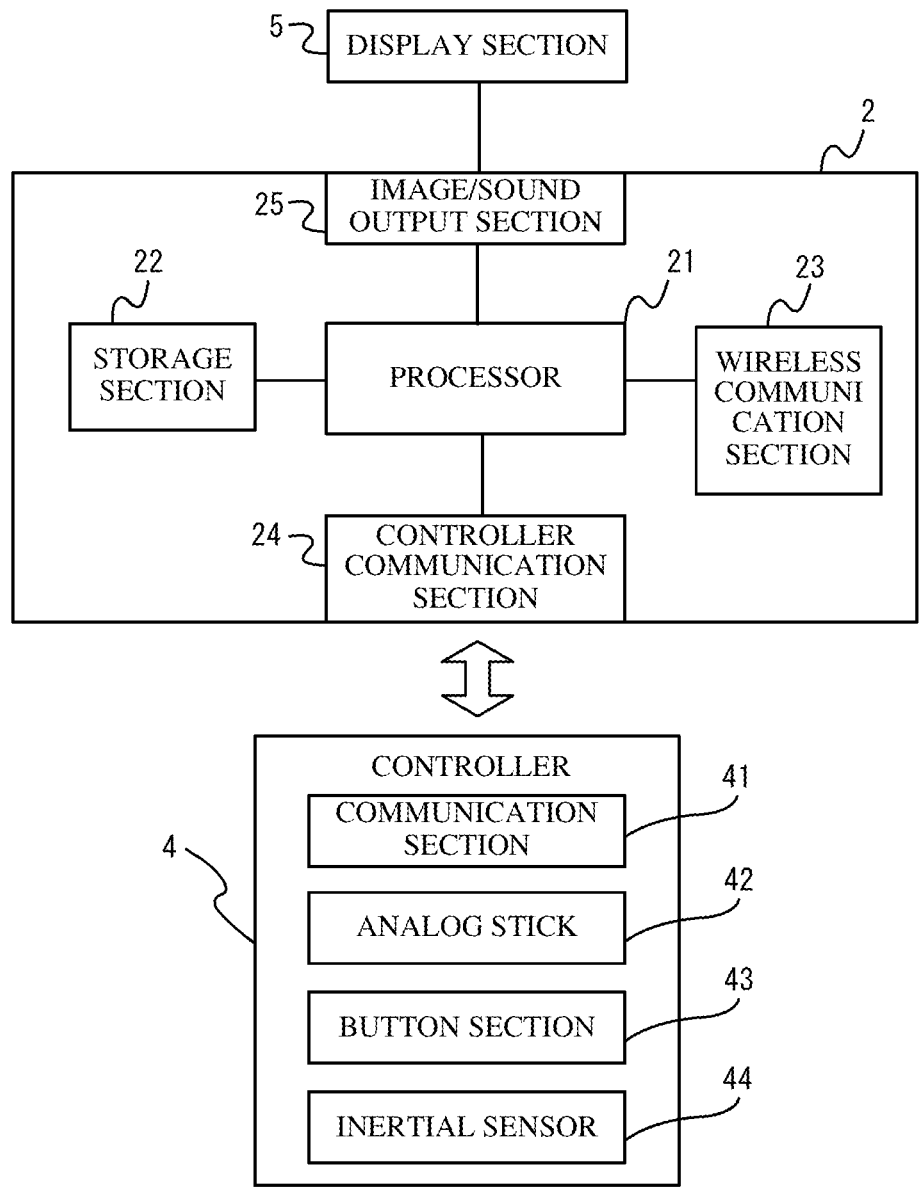
FIG. 1 is a block diagram showing a non-limiting example of an internal configuration and the like of a game apparatus 2.

FIG. 1 is a block diagram showing an example of the internal configuration of a game apparatus 2 according to the exemplary embodiment. The game apparatus 2 includes a processor 21. The processor 21 is an information processing section for executing various types of information processing to be executed by the game apparatus 2. For example, the processor 21 may be composed only of a CPU (Central Processing Unit), or may be composed of a SoC (System-on-a-chip) having a plurality of functions such as a CPU function and a GPU (Graphics Processing Unit) function. The processor 21 performs various types of information processing by executing an information processing program (e.g., a game program) stored in a storage section 22. The storage section 22 may be, for example, an internal storage medium such as a flash memory or a DRAM (Dynamic Random Access Memory), or may be configured to utilize an external storage medium mounted to a slot that is not shown, or the like.

The game apparatus 2 further includes a wireless communication section 23 for allowing the game apparatus 2 to perform wireless communication with another game apparatus 2 or a predetermined server device. Examples of the wireless communication include Internet communication and short-range wireless communication.

The game apparatus 2 further includes a controller communication section 24 for allowing the game apparatus 2 to perform wired or wireless communication with a controller 4.

A display section 5 (e.g., a television) is connected to the game apparatus 2 via an image/sound output section 25. The processor 21 outputs images and sounds generated (by execution of the above-described information processing, for example), to the display section 5 via the image/sound output section 25.

Next, the controller 4 will be described. The controller 4 includes at least one analog stick 42 being an example of a direction input device. The analog stick 42 can be used as a direction input section with which a direction can be input. A user (player) tilts the analog stick 42 and thereby can input a direction corresponding to the direction of the tilt (and input a magnitude corresponding to the angle of the tilt). The controller 4 further includes a button section 43 including various operation buttons. For example, the controller 4 may include a plurality of operation buttons (e.g., A button, B button, X button, Y button) on a main surface of a housing of the controller 4.

The controller 4 includes an inertial sensor 44. Specifically, the controller 4 includes, as the inertial sensor 44, an acceleration sensor and an angular velocity sensor. In the exemplary embodiment, the acceleration sensor detects the magnitudes of accelerations along predetermined three axial directions. The angular velocity sensor detects angular velocities about the predetermined three axes.

The controller 4 further includes a communication section 41 for performing wired or wireless communication with the controller communication section 24. The content of a direction input to the analog stick 42, information indicating the pressed state of the button section 43, and the results of various detections performed by the inertial sensor 44 are repeatedly output to the communication section 41 at appropriate timings and are transmitted to the game apparatus 2.

[Game Assumed in Exemplary Embodiment]

Figure 2:
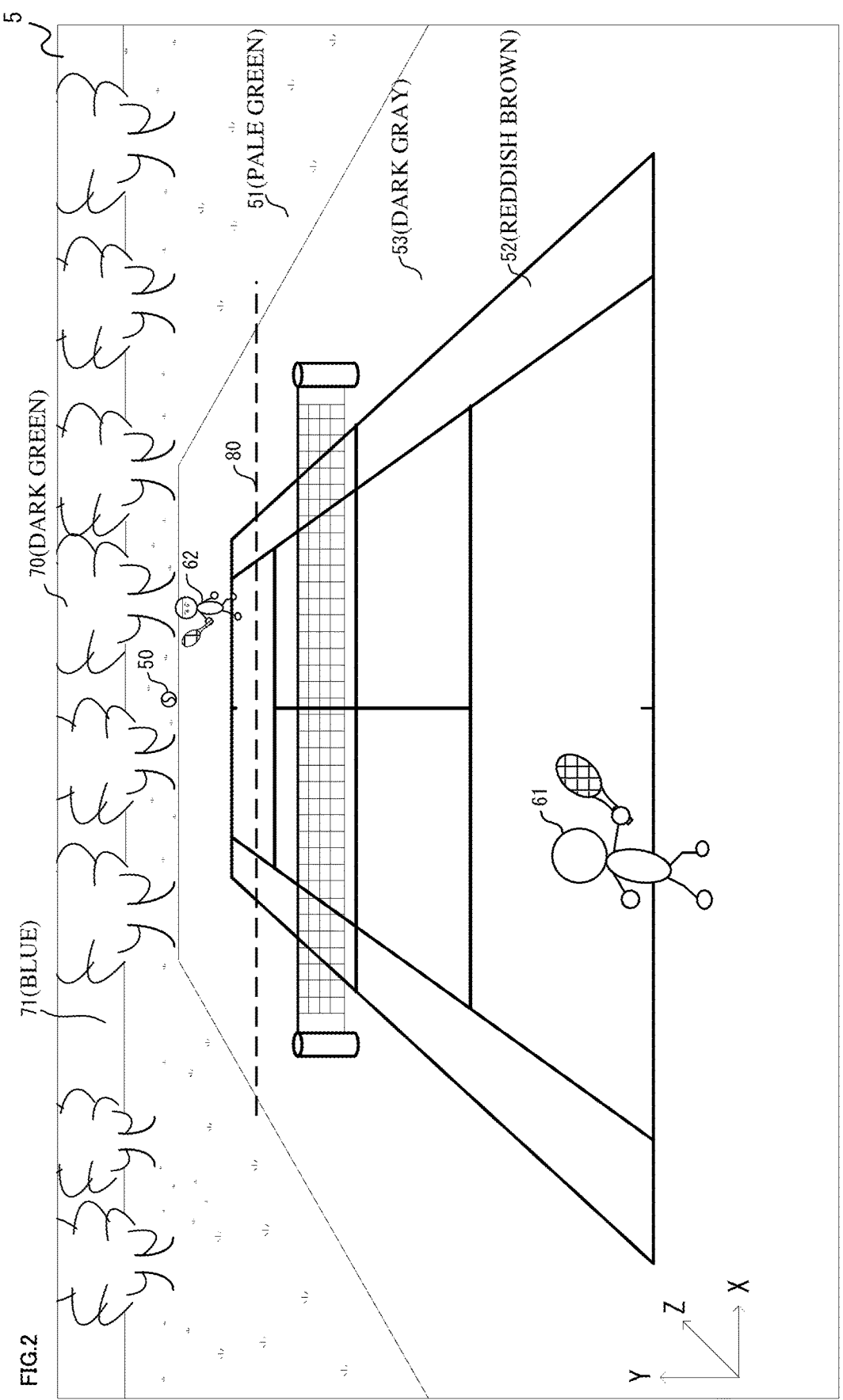
FIG. 2 is a diagram illustrating a game of the present embodiment.

Next, an outline of game processing (an example of information processing) to be executed in the game apparatus 2 according to the exemplary embodiment will be described. First, as shown in FIG. 2, a game assumed in the exemplary embodiment is a tennis game having a motif of "singles". Specifically, in this game, two player character objects (sometimes referred to as "characters") which are virtual human-shaped objects are respectively disposed in an own-side court and an opponent-side court of a tennis court prepared in a virtual space, and a tennis game is performed. The user (player) operates the analog stick 42 to move the character as an operation target, and operates a predetermined operation button to cause the character to perform an action of swinging a tennis racket, thereby hitting a tennis ball.

This game can be played by two users through a network such as the Internet, or short-range wireless communication. In the exemplary embodiment, it is assumed that one user is in charge of one character and operates the character. If there is no opponent user, an opponent character is automatically operated by a computer.

[Outline of Game Processing of Exemplary Embodiment]

Next, an outline of game processing executed by the game apparatus 2 according to the exemplary embodiment will be described. As shown in FIG. 2, in this game, a ground object (sometimes simply referred to as "ground") 51 is disposed in the virtual space. A part of the ground 51 is a tennis court 52, and a court peripheral area 53 is provided as a ground area around the tennis court 52.

The tennis court 52 has a rectangular shape that has long sides of 24 m and short sides of 11 m (in the size in the virtual space). The court peripheral area 53 has a rectangular shape that has long sides of 40 m and short sides of 20 m, including the size of the tennis court 52. An area obtained by combining the tennis court 52 and the court peripheral area 53 may be regarded as a tennis court. As shown in FIG. 2, in the virtual space, the tennis court 52 is arranged such that the long sides are along a Z-axis direction (depth direction), and the short sides are along an X-axis direction (left-right direction). A height from the ground 51 is represented by a value along the Y axis.

The tennis court 52 has a reddish brown color simulating a clay court. The court peripheral area 53 has a dark gray color. An area of the ground 51 excluding the tennis court 52 and the court peripheral area 53 is lawn having a pale green color. Furthermore, as shown in FIG. 2, a plurality of tree objects (sometimes simply referred to as "trees") 70 are disposed on the ground 51 of the lawn behind the tennis court 52. The trees 70 have brown trunks and dark green leaves. In a distant area in the depth direction of the virtual space, a sky background object (sometimes simply referred to as "sky background") representing a background of blue sky is disposed.

In the tennis court 52 (and the court peripheral area 53), a character 61 to be operated by the user (sometimes referred to as "player character") is disposed in the own-side court while a character 62 of an opponent (sometimes referred to as "opponent character") is disposed in the opponent-side court. The player character 61 and the opponent character 62 hit a ball object (sometimes referred to as "ball") 50 back and forth with tennis rackets, whereby the tennis game advances.

The ball 50 is a bicolor (green and blue) ball (see (A) of FIG. 3) having a diameter of 70 mm. As described above, the tennis court 52 is reddish brown and the court peripheral area 53 is dark gray. Therefore, the two colors, green and blue, are used for the ball 50 to prevent reduction in distinguishability (visibility) of the ball 50 by the user. The two colors enable the user to visually recognize rotation of the ball 50.

A virtual camera disposed in the virtual space captures the virtual space from above and behind the player character 61 such that an area including the tennis court 52 and the court peripheral area 53 is included in a capturing range (rendering range: in other words, the field of view of the virtual camera), thereby generating the game image as shown in FIG. 2. Furthermore, the virtual camera moves leftward and rightward in accordance with leftward and rightward movement (movement in the X-axis direction) of the player character 61, and captures the virtual space from above and behind the player character 61.

As described above, outside the court peripheral area 53, the pale green lawn (the area of the ground 51 outside the court peripheral area 53), the trees 70 including dark green leaves, and the blue sky background 71 are present. Therefore, when the bicolor (green and blue) ball 50 overlaps the lawn, the leaves of the trees 70, or the sky background 71 (e.g., when the player character 61 or the opponent character 62 hits a lob shot and the ball 50 goes up high in the air) in the game image, the visibility of the ball 50 is reduced.

In order to ensure the visibility of the ball 50, it is conceivable to render a contour of the ball 50. However, the visibility of the ball 50 is not reduced when the ball 50 overlaps the reddish-brown tennis court 52 or the dark-gray court peripheral area 53, and it is considered that the contour of the ball 50 need not be rendered even in such a case. If the contour of the ball 50 is rendered in the above case, the ball 50 stands out and looks unnatural.

Therefore, in this game, whether or not to render the contour of the ball 50 is determined according to the height of the ball 50 from the ground 51 (a value along the Y axis shown in FIG. 2) and the distance from the virtual camera to the ball 50 (a distance in the Z-axis direction shown in FIG. 2). When it is determined that the contour should be rendered, the contour of the ball 50 is rendered to ensure the visibility of the ball 50. Moreover, in this game, the thickness of the contour with respect to the size of the ball 50 (diameter of 70 mm) is gradually changed according to the height of the ball 50 from the ground 51 and the distance from the virtual camera to the ball 50. A specific description will be given below.

FIG. 3 is a diagram illustrating the thickness of the contour of the ball 50 (the size of the contour object 90) in the virtual space. In this game, a spherical contour object 90 centering on the center of the spherical ball 50 having a diameter of 70.00 mm is provided in the virtual space. In addition, in this game, transparency of the contour object 90 is smoothly changed within a range from 100% to 0% (in other words, opacity of the contour object 90 is smoothly changed within a range from 0% to 100%), and the diameter of the contour object 90 is smoothly changed within a range from 70.00 mm to 100.00 mm.

Hereinafter, a specific description will be given with reference to FIG. 3. As shown in (A) to (D) of FIG. 3, when the height of the ball 50 (precisely, the center of the ball 50) from the ground 51 (i.e., the value along the Y axis shown in FIG. 2) is 3.00 m or less, the transparency of the contour object 90 is 100% (i.e., the contour object 90 is not rendered). The ground 51 is a plane. When the height of the ball 50 from the ground 51 has exceeded 3.00 m, the transparency of the contour object 90 is gradually reduced. When the height is 3.25 m, the transparency of the contour object 90 is 75% as shown in (E) to (H) in FIG. 3. When the height of the ball 50 from the ground 51 has exceeded 3.25 m, the transparency of the contour object 90 is similarly gradually reduced. When the height is 3.50 m, the transparency of the contour object 90 is 50% as shown in (I) to (L) of FIG. 3. When the height of the ball 50 from the ground 51 has exceeded 3.50 m, the transparency of the contour object 90 is similarly gradually reduced. When the height is 4.00 m or more, the transparency of the contour object 90 is 0% as shown in (M) to (P) of FIG. 3 (i.e., the contour object 90 becomes dark gray which is its original color).

Moreover, as shown in FIG. 3, in a case where the distance from the virtual camera to the ball 50 (precisely, the distance from the position, on the Z axis, of the virtual camera to the position, on the Z axis, of the center of the ball 50) is 25.00 m, the diameter of the contour object 90 is gradually increased from 70.00 mm when the height of the ball 50 from the ground 51 has exceeded 3.00 m (see (A) of FIG. 3), and becomes 77.50 mm when the height is 3.25 m (see (E) of FIG. 3). The position at which the distance from the virtual camera to the ball 50 is 25.00 m is indicated by a broken line 80 in FIG. 2. When the height of the ball 50 from the ground 51 is 3.00 m or less and when the distance from the virtual camera to the ball 50 is less than 25.00 m, the diameter of the contour object 90 is fixed to 70.00 mm. When the height of the ball 50 from the ground 51 has exceeded 3.25 m, the diameter of the contour object 90 is similarly gradually increased, and becomes 85.00 mm when the height is 3.50 m (see (I) of FIG. 3). When the height of the ball 50 from the ground 51 has exceeded 3.50 m, the diameter of the contour object 90 is similarly gradually increased, and becomes 100.00 mm when the height is 4.00 m or more (see (M) of FIG. 3).

In a case where the distance from the virtual camera to the ball 50 is 27.00 m, the diameter of the contour object 90 is gradually increased from 70.00 mm when the height of the ball 50 from the ground 51 has exceeded 3.00 m (see (B) of FIG. 3), and becomes 80.00 mm when the height is 3.25 m (see (F) of FIG. 3). When the height of the ball 50 from the ground 51 has exceeded 3.25 m, the diameter of the contour object 90 is similarly gradually increased, and becomes 90.00 mm when the height is 3.50 m (see (J) of FIG. 3). When the height of the ball 50 from the ground 51 has exceeded 3.50 m, the diameter of the contour object 90 is similarly gradually increased, and becomes 100.00 mm when the height is 4.00 m or more (see (N) of FIG. 3).

In a case where the distance from the virtual camera to the ball 50 is 29.00 m, the diameter of the contour object 90 is gradually increased from 70.00 mm when the height of the ball 50 from the ground 51 has exceeded 3.00 m (see (C) of FIG. 3), and becomes 90.00 mm when the height is 3.25 m (see (G) of FIG. 3). When the height of the ball 50 from the ground 51 has exceeded 3.25 m, the diameter of the contour object 90 is similarly gradually increased, and becomes 95.00 mm when the height is 3.50 m (see (K) of FIG. 3). When the height of the ball 50 from the ground 51 has exceeded 3.50 m, the diameter of the contour object 90 is similarly gradually increased, and becomes 100.00 mm when the height is 4.00 m or more (see (O) of FIG. 3).

In a case where the distance from the virtual camera to the ball 50 is 31.00 m, the diameter of the contour object 90 is gradually increased from 70.00 mm when the height of the ball 50 from the ground 51 has exceeded 3.00 m (see (D) of FIG. 3), and becomes 100.00 mm when the height is 3.25 m or more (see (H), (L), (P) of FIG. 3).

In the above description, the diameter of the contour object 90 being "gradually (smoothly) increased" with increase in the height of the ball 50 from the ground 51, has been described with reference to FIG. 3, but the diameter of the contour object 90 is also "gradually (smoothly) increased" with increase in the distance from the virtual camera to the ball 50. The diameter and the transparency of the contour object 90 to be changed according to the height and the depth are each determined by interpolation between a maximum value and a minimum value that are set in advance. Various interpolation methods are applicable. For example, linear interpolation or Hermite interpolation may be used.

Here, a method of rendering the contour object 90 and the ball 50 will be described. In this game, the contour object 90 and the ball 50 are rendered by a rendering method in which a part, of the contour object 90, which overlaps the ball 50 as viewed from the virtual camera (point of view) is not rendered, thereby rendering the contour of the ball 50 in the game image. A specific description will be given below. First, the surface of a polygon constituting a sphere of each of the contour object 90 and the ball 50 is an outer surface of the sphere (i.e., the direction of a normal vector of the polygon faces outward with respect to the surface of the sphere). While the surface of the polygon (the outer surface of the sphere) is rendered, the rear surface of the polygon (the inner surface of the sphere) is not rendered. When rendering is performed by using a Z buffer method, first, a part, of the contour object 90, which is visible from the virtual camera is rendered, but a Z-buffer value (Z value) of the rendered part is not updated. Thereafter, a part, of the ball (ball object) 50, which is visible from the virtual camera is rendered. Thus, since the Z-buffer value regarding the contour object 90 rendered first has not been updated, the ball 50 rendered later is displayed without being hidden behind the contour object 90, whereby the contour of the ball 50 is rendered in the game image as shown in FIG. 4 described later.

The contour of the ball 50 may be rendered by another rendering method. In the other rendering method, the surface of the polygon constituting the sphere of the contour object 90 is an inner surface of the sphere (i.e., the direction of the normal vector of the polygon faces inward with respect to the surface of the sphere). In other words, the rear surface of the polygon constituting the sphere of the contour object 90 is an outer surface of the sphere. Since the rear surface of the polygon (the outer surface of the contour object 90) as viewed from the virtual camera is not rendered, the surface of the ball 50 is rendered, and the surface (inner surface) of the contour object 90 is rendered, as the contour, around the surface of the ball 50.

Figure 4:
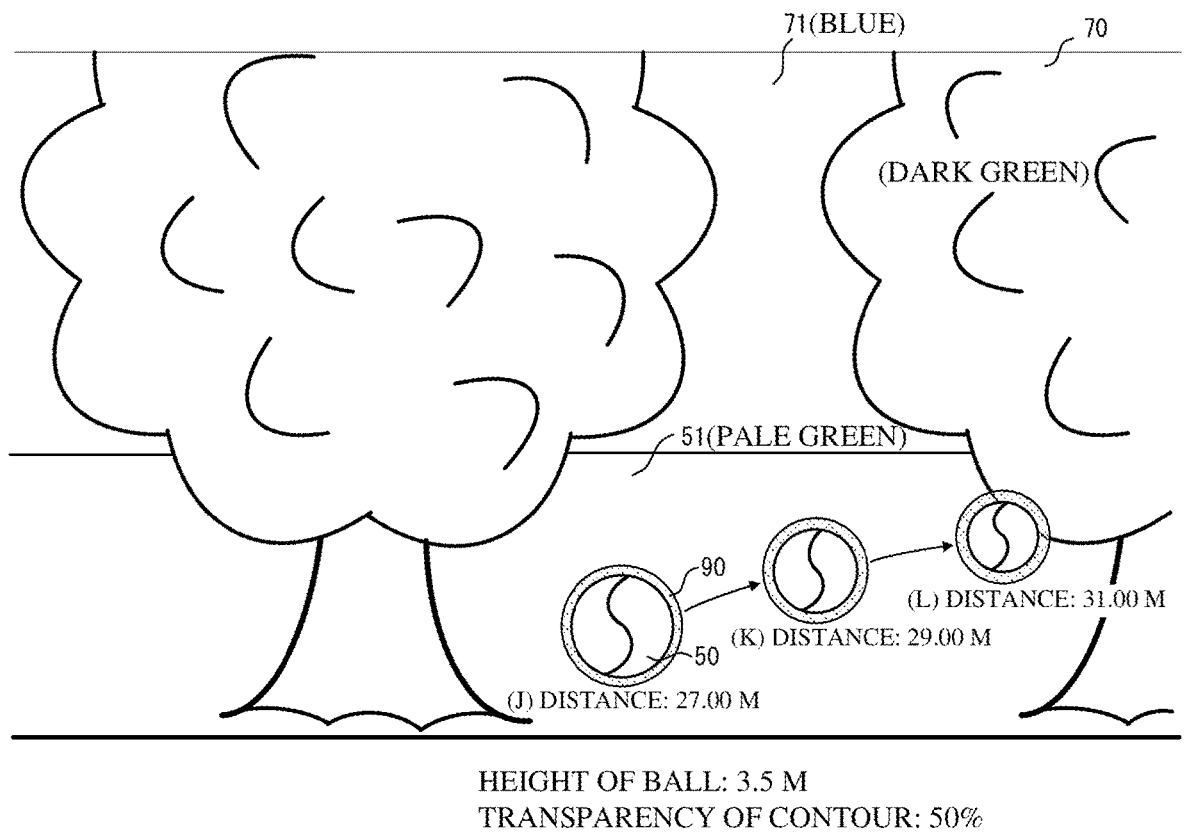
FIG. 4 is a diagram illustrating how a ball appears in a game screen (game image)

FIG. 4 is a diagram illustrating how the ball 50 and the contour appear in the game screen (game image) of this game. FIG. 4 is an enlarged view of an area around the ball 50 shown in FIG. 2. FIG. 4 shows, for example, a scene in which the ball 50 with the contour being rendered (displayed) is moving from the near side to the far side of the tennis court 52, at a height of 3.5 m from the ground 51. The ball 50 (and the contour object 90) shown in (J), (K), (L) of FIG. 4 corresponds to the ball 50 (and the contour object 90) shown in (J), (K), (L) of FIG. 3, respectively.

As shown in FIG. 4, in the game screen, the ball 50 and the contour object 90 in the virtual space are displayed to be gradually reduced in size as they move from the near side to the far side. As described with reference to FIG. 3, the contour object 90 is increased in size with increase in distance from the virtual camera in the virtual space. Therefore, as shown in FIG. 4, in the game screen, although the ball 50 is displayed to be gradually reduced in size, the size of the contour object 90 (i.e., the thickness of the contour) is not so reduced as the ball 50 is reduced in size. Therefore, in this game, as shown in FIG. 4, the contour of the ball 50 can be emphasized and highlighted (made conspicuous) as the ball 50 moves in the depth direction, whereby the visibility of the ball 50 can be ensured. At this time, the size of the ball 50 itself is not changed, whereby the visibility can be ensured without deteriorating a sense of perspective.

Moreover, in this game, since the contour of the ball 50 can be emphasized and highlighted (made conspicuous) in the game screen (game image) by increasing the diameter (or reducing the transparency) of the contour object 90 according to the height of the ball 50 (see FIG. 3), the visibility of the ball 50 can be ensured.

[Details of Information Processing of Exemplary Embodiment]

Figure 5:
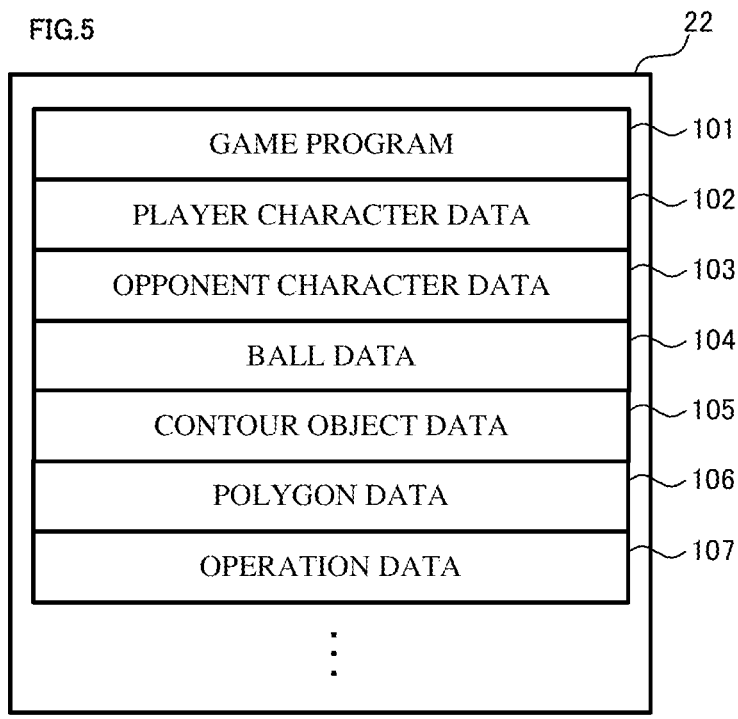
FIG. 5 shows a non-limiting example of various types of data stored in a storage section 22.

Next, information processing according to the exemplary embodiment will be described in detail with reference to FIG. 5 to FIG. 7.

[Data to be Used]

Various data used in this game processing will be described. FIG. 5 shows an example of a program and data stored in the storage section 22 of the game apparatus 2. The storage section 22 has, stored therein, a game program 101, player character data 102, opponent character data 103, ball data 104, contour object data 105, polygon data 106, operation data 107, and the like.

The game program 101 is a game program for executing game processing according to the exemplary embodiment.

The player character data 102 is data that defines a player character in the virtual space of this game, and indicates the size, position, direction, posture, moving speed, moving direction, etc., of the player character.

The opponent character data 103 is data that defines an opponent character in the virtual space of this game, and indicates the size, position, direction, posture, moving speed, moving direction, etc., of the opponent character.

The ball data 104 is data that defines the size, position, moving direction, moving speed, etc., of the ball 50 in the virtual space of this game. With this ball data 104, movement of the ball 50 is controlled in the virtual space.

The contour object data 105 is data that defines the size, position, moving direction, moving speed, etc., of the contour object 90 in the virtual space of this game. With this contour object data 105, movement of the contour object 90 is controlled together with the ball 50 in the virtual space. The contour object data 105 includes data indicating a relationship between the transparency of the contour object 90 and the distance from the ground 51 to the center of the ball 50 (the center of the contour object 90). The contour object data 105 further includes data indicating a relationship between the diameter of the contour object 90, and the distance from the virtual camera (point of view) to the center of the ball 50 (the distance in the Z-axis direction shown in FIG. 2) and the distance from the ground 51 to the center of the ball 50.

The polygon data 106 is data for forming (constituting), in the virtual space, the objects such as the player character 61, the opponent character 62, the ground 51 (including the tennis court 52, etc.), the ball 50, the trees 70, the sky background 71, etc.

The operation data 107 is data indicating an operation performed on the game apparatus 2.

[Details of Game Processing]

Next, the game processing according to the exemplary embodiment will be described in detail with reference to flowcharts. FIG. 6 and FIG. 7 are examples of flowcharts showing the game processing according to the exemplary embodiment in detail.

Figure 6:
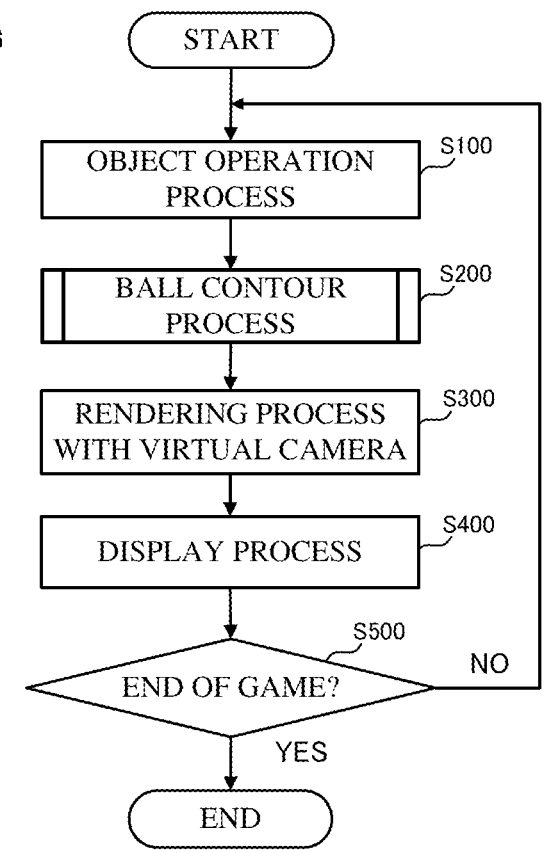
FIG. 6 is a non-limiting example of a flowchart of game processing.

In step S100 in FIG. 6, the processor 21 performs an object operation process. Specifically, the processor 21 performs: a control for moving, based on the operation data 107, the player character 61 in the virtual space; a control for moving, based on the opponent character data 103, the opponent character 62 which acts based on an operation performed on another game apparatus 2; a control for moving the ball 50 (and the contour object 90), based on the ball data 104; and the like. Moreover, in the object operation process, a process of causing the player character 61 to hit the ball 50 with a tennis racket in the virtual space is also performed based on the operation data 107. Thereafter, the process shifts to step S200.

In step S200, the processor 21 performs a ball contour process. FIG. 7 is an example of a flowchart of the ball contour process. Hereinafter, the ball contour process will be described with reference to FIG. 7.

Figure 7:
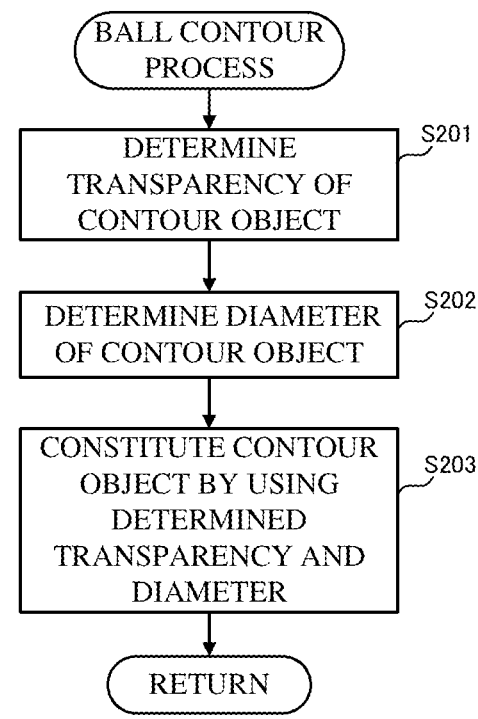
FIG. 7 is a non-limiting example of a flowchart of a ball contour process.

In step S201 in FIG. 7, the processor 21, based on the contour object data 105, determines the transparency of the contour object 90 disposed in the virtual space. For example, the processor 21 determines the transparency of the contour object 90 to be 0% when the distance from the ground 51 to the center of the ball 50 (the center of the contour object 90) is 4.00 m (see (N) of FIG. 3, for example). Thereafter, the process shifts to step S202.

In step S202, the processor 21, based on the contour object data 105, determines the diameter of the contour object 90 arranged in the virtual space. For example, the processor 21 determines the diameter of the contour object 90 to be 95.00 mm when the distance from the virtual camera (point of view) to the center of the ball 50 (the center of the contour object 90) is 29.00 m and the distance from the ground 51 to the center of the ball 50 is 3.50 m (see (K) of FIG. 3, for example). Thereafter, the process shifts to step S203.

In step S203, the processor 21 constitutes, in the virtual space, the contour object 90 by using the transparency and the diameter determined in step S201 and step S202. Thereafter, the process shifts to step S300 in FIG. 6.

In step S300 in FIG. 6, the processor 21 generates a game image by causing the virtual camera to capture the virtual space. At this time, the processor 21 renders the contour object 90 and the ball 50 by using the rendering method described with reference to FIG. 3, thereby rendering the contour of the ball 50 in the game image (see FIG. 4). Thereafter, the process shifts to step S400.

In step S400, the processor 21 performs a display process of outputting, to the display section 5, the game image generated in step S300, and causing the display section 5 to display the game screen. Thereafter, the process shifts to step S500.

In step S500, the processor 21 determines whether or not to end this game. Specifically, the processor 21 determines whether or not an end condition for this game (e.g., a condition for ending the match) has been satisfied. When the determination is YES, the game processing is ended. When the determination is NO, the process returns to step S100 and steps S100 to S400 are executed to continue the game.

As described above, according to the exemplary embodiment, in the virtual space, when the height of the ball 50 from the ground 51 exceeds a predetermined height (3.00 m), the contour object 90 is rendered while the transparency of the contour object 90 is gradually reduced from 100% (see FIG. 3). Thus, when the ball 50 does not overlap the area outside the tennis court 52 and the court peripheral area 53 in the game image as shown in FIG. 2, the visibility of the ball 50 is ensured. Therefore, basically, the contour of the ball 50 is not rendered. Meanwhile, when the ball 50 overlaps the area outside the tennis court 52 and the court peripheral area 53, there is a possibility that the visibility of the ball 50 is not ensured. Therefore, the contour of the ball 50 is basically rendered, whereby the visibility of the ball 50 can be ensured. According to the exemplary embodiment, whether or not to render the contour of the ball 50 is determined according to the height or the like of the ball 50 in the virtual space. Therefore, the determination can be performed through a simple process.

As described above, according to the exemplary embodiment, rendering is performed such that, in the virtual space, the transparency of the contour object 90 is gradually reduced to gradually deepen the color of the contour object 90 with increase in the height of the ball 50 from the ground 51 (see FIG. 3). Therefore, according to the exemplary embodiment, in the game image as shown in FIG. 2, as the ball 50 flies high in the air and the visibility of the ball 50 becomes easily reduced, the contour of the ball 50 can be deepened in color. Thus, the visibility of the ball 50 can be effectively ensured in a natural way.

Moreover, as described above, according to the exemplary embodiment, in the virtual space, when the distance from the virtual camera to the ball 50 (the distance in the Z-axis direction shown in FIG. 2) has exceeded a predetermined distance (25.00 m: a broken line denoted by a reference numeral "80" in FIG. 2), the contour object 90 is rendered with the diameter of the contour object 90 being gradually increased (see FIG. 3). Thus, according to the exemplary embodiment, the thickness of the contour with respect to the size (diameter of 70.00 mm) of the ball 50 can be changed according to the distance from the virtual camera to the ball 50, whereby the visibility of the ball 50 can be improved.

Moreover, as described above, according to the exemplary embodiment, in the virtual space, when the height of the ball 50 from the ground 51 (a distance in the Y-axis direction shown in FIG. 2) has exceeded a predetermined height (3.00 m), the contour object 90 is rendered with the diameter of the contour object 90 being gradually increased (see FIG. 3). Thus, according to the exemplary embodiment, the thickness of the contour with respect to the size (diameter of 70.00 mm) of the ball 50 can be changed according to the height of the ball 50 from the ground 51, whereby the visibility of the ball 50 can be improved.

[Modifications]

In the above exemplary embodiment, the tennis game has been described as an example. However, the present disclosure may be applied to, instead of the tennis game, a golf game, a baseball game, or the like, for example.

In the above exemplary embodiment, the contour of the ball 50 is rendered in the game image by using the contour object 90 in the virtual space. However, the contour of the ball 50 may be rendered in the game image without using (providing) the contour object 90. For example, in the process of rendering the ball 50 by using the Z buffer method, if the Z value of an outer peripheral edge portion of the ball 50 is significantly different from the Z value of a portion (e.g., the trees 70 or the sky background 71) adjacent to the edge portion (that is, when a difference between the Z values is determined to be a predetermined difference or more), a predetermined number of pixels outside the edge portion are rendered (painted) as a contour, whereby a contour of a width corresponding to the predetermined number of pixels may be rendered in the game image.

In the above exemplary embodiment (see FIG. 4), the diameter of the contour object 90 is desired to be increased in the virtual space to such an extent that the thickness of the contour (the width of the contour in the game screen) is not reduced even when the ball 50 moves in the depth direction in the game screen.

In the above exemplary embodiment, the transparency of the contour object 90 is changed according to the height of the ball 50 from the ground 51, and the diameter of the contour object 90 is changed according to the height of the ball 50 from the ground 51 and the distance (depth) of the ball 50 from the virtual camera (see FIG. 3). However, as shown in FIG. 8, the transparency of the contour object 90 may always be 0% regardless of the height of the ball 50 (i.e., may always be displayed in dark gray which is its original color), and the diameter of the contour object 90 may not necessarily be changed according to the distance from the virtual camera to the ball 50. Specifically, as shown in FIG. 8, in a case where the distance from the virtual camera to the ball 50 is 25.00 m or more, the diameter of the contour object 90 is gradually increased from 70.00 mm when the height of the ball 50 from the ground 51 has exceeded 3.00 m (see (A) of FIG. 8), and becomes 80.00 mm when the height is 3.25 m (see (B) of FIG. 8). When the height of the ball 50 from the ground 51 has exceeded 3.25 m, the diameter of the contour object 90 is similarly gradually increased, and becomes 90.00 mm when the height is 3.50 m (see (C) of FIG. 8). When the height of the ball 50 from the ground 51 has exceeded 3.50 m, the diameter of the contour object 90 is similarly gradually increased, and becomes 100.00 mm when the height is 4.00 m or more (see (D) of FIG. 8). As in the case of FIG. 3, when the height of the ball 50 from the ground 51 is 3.00 m or less and when the distance from the virtual camera to the ball 50 is less than 25.00 m, the diameter of the contour object 90 is fixed to 70.00 mm. The diameter and the transparency of the contour object 90 to be changed according to the height and the depth are each determined by interpolation between a maximum value and a minimum value that are set in advance. Various interpolation methods are applicable. For example, linear interpolation or Hermite interpolation may be used.

In the above exemplary embodiment, the case where the series of processes regarding the game processing are executed by a single game apparatus 2, has been described. However, in another embodiment, the series of processes may be executed in an information processing system that includes a plurality of information processing apparatuses. For example, in an information processing system that includes a terminal side apparatus and a server side apparatus capable of communicating with the terminal side apparatus via a network, a part of the series of processes may be executed by the server side apparatus. Alternatively, in an information processing system that includes a terminal side apparatus and a server side apparatus capable of communicating with the terminal side apparatus via a network, a main process of the series of processes may be executed by the server side apparatus, and a part of the series of the processes may be executed by the terminal side apparatus. Still alternatively, in the information processing system, a server side system may include a plurality of information processing apparatuses, and a process to be executed on the server side may be executed by the plurality of information processing apparatuses in a shared manner. In addition, a so-called cloud gaming configuration may be adopted. For example, the game apparatus 2 may send operation data indicating a user's operation to a predetermined server, and the server may execute various types of game processing and stream the execution result as video/audio to the game apparatus 2.

While the exemplary embodiment has been described in detail, the foregoing description is in all aspects illustrative and not restrictive. It is to be understood that numerous other modifications and variations can be devised without departing from the scope of the exemplary embodiments.

What is claimed is:

1. A non-transitory computer-readable storage medium having stored therein instructions that, when executed by a processor of an information processing apparatus, cause the information processing apparatus to provide execution comprising:

setting, in a virtual space, a virtual camera in a direction such that at least a part of a ground arranged in the virtual space is within a field of view of the virtual camera;

controlling, based on game processing, movement of a predetermined object located above the ground in the virtual space; and performing, based on the virtual camera, a rendering process of generating a game image that includes the ground and the object, and when a height of the object in the virtual space is higher than a predetermined height, generating the game image through a rendering process of rendering a contour of at least the object according to the height of the object.

2. The non-transitory computer-readable storage medium according to claim 1, wherein in the rendering process, the information processing apparatus is caused to provide execution comprising rendering the contour with opacity according to the height of the object.

3. The non-transitory computer-readable storage medium according to claim 1, wherein in the rendering process, the information processing apparatus is caused to provide execution comprising generating the game image through a rendering process of rendering the contour by rendering a contour object larger than the object.

4. The non-transitory computer-readable storage medium according to claim 1, wherein in the rendering process, the information processing apparatus is caused to provide execution comprising generating the game image through a rendering process in which the contour is thickly rendered with respect to a size of the rendered object, according to a depth of the object with respect to the virtual camera.

5. The non-transitory computer-readable storage medium according to claim 1, wherein in the rendering process, the information processing apparatus is caused to provide execution comprising generating the game image through a rendering process in which the contour is rendered to be thick with respect to a size of the rendered object, according to the height of the object.

6. The non-transitory computer-readable storage medium according to claim 3, wherein in the rendering process, the information processing apparatus is caused to provide execution comprising generating the game image through the rendering process such that a size of the contour object is increased according to a depth of the object with respect to the virtual camera.

7. The non-transitory computer-readable storage medium according to claim 1, wherein the information processing apparatus is caused to provide execution comprising performing, as the game processing, a process of causing a player character in the virtual space to hit back the object, based on an operation input.

8. The non-transitory computer-readable storage medium according to claim 7, wherein the object is a ball object, the at least part of the ground is a court where the player character and an opponent character that is an opponent of the player character are arranged, and the information processing apparatus is caused to provide execution comprising setting the virtual camera, at a position behind and above the player character, in a direction such that the court is within the field of view of the virtual camera, and performing, as the game processing, sport game processing in which the player character is caused to return the ball object hit by the opponent character, based on an operation input.

9. The non-transitory computer-readable storage medium according to claim 8, wherein the information processing apparatus is caused to provide execution comprising controlling movement of the player character on the court, based on an operation input, and shifting the position of the virtual camera in accordance with movement of the player character.

10. The non-transitory computer-readable storage medium according to claim 8, wherein the court includes a tennis court, and the sport game processing includes tennis game processing.

11. A game processing system, comprising:
a processor; and
a memory configured to store computer readable instructions that, when executed by the processor, cause the game processing system to:
set, in a virtual space, a virtual camera in a direction such that at least a part of a ground arranged in the virtual space is within a field of view of the virtual camera;
control, based on game processing, movement of a predetermined object located above the ground in the virtual space; and
perform, based on the virtual camera, a rendering process of generating a game image that includes the ground and the object, and when a height of the object in the virtual space is higher than a predetermined height, generate the game image through a rendering process of rendering a contour of at least the object according to the height of the object.

12. The game processing system according to claim 11, wherein the game processing system is caused to, in the rendering process, render the contour with opacity according to the height of the object.

13. The game processing system according to claim 11, wherein the game processing system is caused to, in the rendering process, generate the game image through a rendering process of rendering the contour by rendering a contour object larger than the object.

14. The game processing system according to claim 11, wherein the game processing system is caused to, in the rendering process, generate the game image through a rendering process in which the contour is thickly rendered with respect to a size of the rendered object, according to a depth of the object with respect to the virtual camera.

15. The game processing system according to claim 11, wherein the game processing system is caused to, in the rendering process, generate the game image through a rendering process in which the contour is thickly rendered with respect to a size of the rendered object, according to the height of the object.

16. The game processing system according to claim 13, wherein the game processing system is caused to, in the rendering process, generate the game image by performing the rendering process such that a size of the contour object is increased according to a depth of the object with respect to the virtual camera.

17. The game processing system according to claim 11, wherein the game processing system is caused to:
perform, as the game processing, a process of causing a player character in the virtual space to hit back the object, based on an operation input, wherein
the object is a ball object, the at least part of the ground is a court where the player character and an opponent character that is an opponent of the player character are arranged, and the game processing system is caused to set the virtual camera, at a position behind and above the player character, in a direction such that the court is within the field of view of the virtual camera, and perform, as the game processing, sport game processing in which the player character is caused to return the ball object hit by the opponent character, based on an operation input.

18. The game processing system according to claim 17, wherein the game processing system is caused to control movement of the player character on the court, based on an operation input, and shift the position of the virtual camera in accordance with movement of the player character.

19. The game processing system according to claim 17, wherein the court includes a tennis court, and the sport game processing includes tennis game processing.

20. A game processing apparatus, comprising:
a display; and
processing circuitry including at least one processor, wherein the processing circuitry is configured to:
set, in a virtual space, a virtual camera in a direction such that at least a part of a ground arranged in the virtual space is within a field of view of the virtual camera;
control, based on game processing, movement of a predetermined object located above the ground in the virtual space; and
perform, based on the virtual camera, a rendering process of generating a game image that includes the ground and the object, and when a height of the object in the virtual space is higher than a predetermined height, generate the game image through a rendering process of rendering a contour of at least the object according to the height of the object.

21. A game processing method executed by a computer configured to control a processing system, the game processing method comprising:
setting, in a virtual space, a virtual camera in a direction such that at least a part of a ground arranged in the virtual space is within a field of view of the virtual camera;
controlling, based on game processing, movement of a predetermined object located above the ground in the virtual space; and
performing, based on the virtual camera, a rendering process of generating a game image that includes the ground and the object, and in association with a height of the object in the virtual space is being higher than a predetermined height, generating the game image through a rendering process of rendering a contour of at least the object according to the height of the object.

22. The non-transitory computer-readable storage medium according to claim 1, wherein
the virtual space includes objects formed by polygons, and
the objects formed by polygons are arranged in the virtual space.

* * * * *